United States Patent [19]

Zweifel et al.

[11] Patent Number: 5,053,767
[45] Date of Patent: Oct. 1, 1991

[54] AIRCRAFT WINDSHEAR DETECTION BASED ON ENERGY LOSS

[75] Inventors: Terry L. Zweifel; Khosrow H. Youssefi, both of Phoenix, Ariz.

[73] Assignee: Honeywell Inc., Minneapolis, Minn.

[21] Appl. No.: 491,873

[22] Filed: Mar. 12, 1990

[51] Int. Cl.$^5$ ............................................. G08B 23/00
[52] U.S. Cl. ................................... 340/968; 244/191; 340/963
[58] Field of Search ...................... 340/963, 968, 967; 73/178 R; 364/433, 434; 244/191

[56] References Cited

U.S. PATENT DOCUMENTS

| | | | |
|---|---|---|---|
| 4,079,905 | 3/1978 | Greene | 340/968 |
| 4,250,746 | 2/1981 | Vassie et al. | 73/178 T |
| 4,593,285 | 6/1986 | Miller et al. | 340/968 |
| 4,728,951 | 3/1988 | Johnson et al. | 340/968 |
| 4,763,266 | 8/1988 | Schultz et al. | 340/968 |
| 4,797,674 | 1/1989 | Zweifel et al. | 340/968 |
| 4,853,861 | 8/1989 | Ford et al. | 340/968 |
| 4,857,922 | 8/1989 | Miller et al. | 340/968 |
| 4,891,642 | 1/1990 | Muller | 340/968 |

Primary Examiner—Donnie L. Crosland
Assistant Examiner—Brent A. Swarthout
Attorney, Agent, or Firm—Arnold L. Albin

[57] ABSTRACT

The invention provides for the detection of both longitudinal and vertical windshears during the takeoff and landing phases of aircraft flight. Standard instrumentation available on many aircraft is used to calculate the aircraft's energy loss or gain by integrating the value of the longitudinal shear. When the energy loss or gain exceeds predetermined levels, appropriate annunciation is provided to the human pilot. The same standard instrumentation aforementioned is also used to calculate changes in the aircraft's specific energy rate, that is the aircraft's actual energy rate divided by the aircraft's weight, to determine the effect of vertical winds. Specific energy rate is calculated by integrating the difference between the aircraft's acceleration relative to the ground and its acceleration relative to the airmass in which it is flying. To preclude false annunciations caused by the integration of small biases resulting from sensor or computational errors, all integrations are set to zero, that is the integrators are reset whenever the relevant parameters are below predetermined thresholds.

14 Claims, 5 Drawing Sheets

AIRCRAFT WINDSHEAR DETECTION BASED ON ENERGY LOSS

BACKGROUND OF THE INVENTION

1. Field of the Invention

The present invention relates to aircraft instruments, and more particularly to apparatus for the detection of windshear encounters during the takeoff and landing phases of flight utilizing the sensing of energy change and change of energy rate of the aircraft. 2. Description of the Prior Art Low altitude encounters with a weather condition known as windshear have resulted in several aircraft accidents in the past. Windshear may be defined as a sudden change in the magnitude or direction of the prevailing wind, this being a difference between an airmass reference proximate to the aircraft and an inertial or ground-based reference.

In an encounter with a windshear, the aircraft may experience either an airspeed gain or loss dependent on the sign of the wind change. Similarly, it may experience a downward or upward wind sufficient to perturb the aircraft's flight path appreciably. The most dangerous of the windshear conditions are those resulting in airspeed loss or downward wind that tends to push the aircraft toward the ground. In the former case, loss of airspeed may result in a stall condition wherein the aircraft has lost lift If the pilot attempts to prevent the loss of speed, he will have to decrease the pitch attitude of the aircraft thereby causing the aircraft to descend toward the ground. In the latter case, the downward motion of the airmass can cause the aircraft to descend toward the ground and the pilot's attempts to arrest the descent by increasing the attitude of the aircraft can result in a stalled condition. Consequently, it is desirable to notify the pilot as quickly as possible of impending windshears so as to enable him to take corrective action as soon as possible.

A number of attempts and proposals have been made in the past to provide the pilot of an aircraft during a takeoff phase of landing approach with a warning of impending windshear conditions. Many of these have involved some means for detecting changes in ground speed as by using a ground based reference such as distance measuring equipment (DME) or by using an airspeed transducer and measuring the rate of change of its output, augmented by longitudinal acceleration to provide an inertial component related to the earth. Still other proposals have added vertical accelerometers to provide measures of aircraft vertical motion produced by the effects of windshear or utilized an input in accordance with the downdrift angle of the aircraft from the desired flight path. Some prior art windshear detection systems typically used a fixed, predetermined threshold of the rate of change of the wind with respect to time. More sophisticated systems, as for example the present assignee's U.S. Pat. No. 4,728,951, entitled "Vertical Windshear Detection for Aircraft", utilized a variable threshold dependent on the magnitude of the measured wind rate.

Prior art systems suffered either from the inability to detect low level sustained windshears due to high threshold levels required to prevent nuisance annunciations or complicated timing circuitry that added complexity to the system. The present invention overcomes these shortcomings by utilizing a direct integration of the change in the energy and energy rate of the aircraft. Hence, loss or gain of energy or energy rate is the criteria for windshear detection. If the loss or gain exceeds a predetermined threshold, annunciation of a windshear condition is presented to the pilot.

SUMMARY OF THE INVENTION

The present invention provides for the timely and reliable detection of both longitudinal and vertical windshear during takeoff and landing phases of flight. Standard instrumentation available on most aircraft is used to sense and calculate the energy lost or gained due to a windshear condition. The present invention utilizes vertical and longitudinal acceleration, true airspeed, pitch angle and angle of attack sensors. To determine the energy loss or gain produced by a longitudinal windshear, the windshear magnitude is integrated to determine energy loss or gain. When the energy loss or gain exceeds a predetermined threshold, annunciation of the condition is presented to the human pilot. The output of the integration is set to zero whenever the magnitude of the windshear is less than a predetermined threshold, thus precluding sensor and computational biases from producing a false windshear annunciation.

For vertical windshears, the change in specific energy rate is determined by integrating the difference between the aircraft's acceleration relative to the ground and relative to the airmass in which it is flying. When the gain or loss of specific energy rate exceeds a predetermined level, annunciation is provided to the human pilot. If the specific energy rate is less than a predetermined threshold, the output of the integrator is set to zero to preclude sensor and computational biases from producing false windshear annunciations.

The preferred embodiment of a windshear detection and warning apparatus comprises means for providing a signal representative of a change in energy of the aircraft with respect to a sustaining airmass and means for providing a reference signal corresponding to a predetermined minimum magnitude of an allowable change in energy level. The aircraft generated signal representative of a change in energy and the reference signal are compared, and an alarm signal is generated when the change in energy exceeds the reference signal. A first alarm signal is generated to identify an increase in energy level with respect to the change in energy, and a second alarm signal is generated to identify a decrease in energy level of the aircraft with respect to the sensed change in energy.

DESCRIPTION OF PREFERRED EMBODIMENTS

Figure 1:
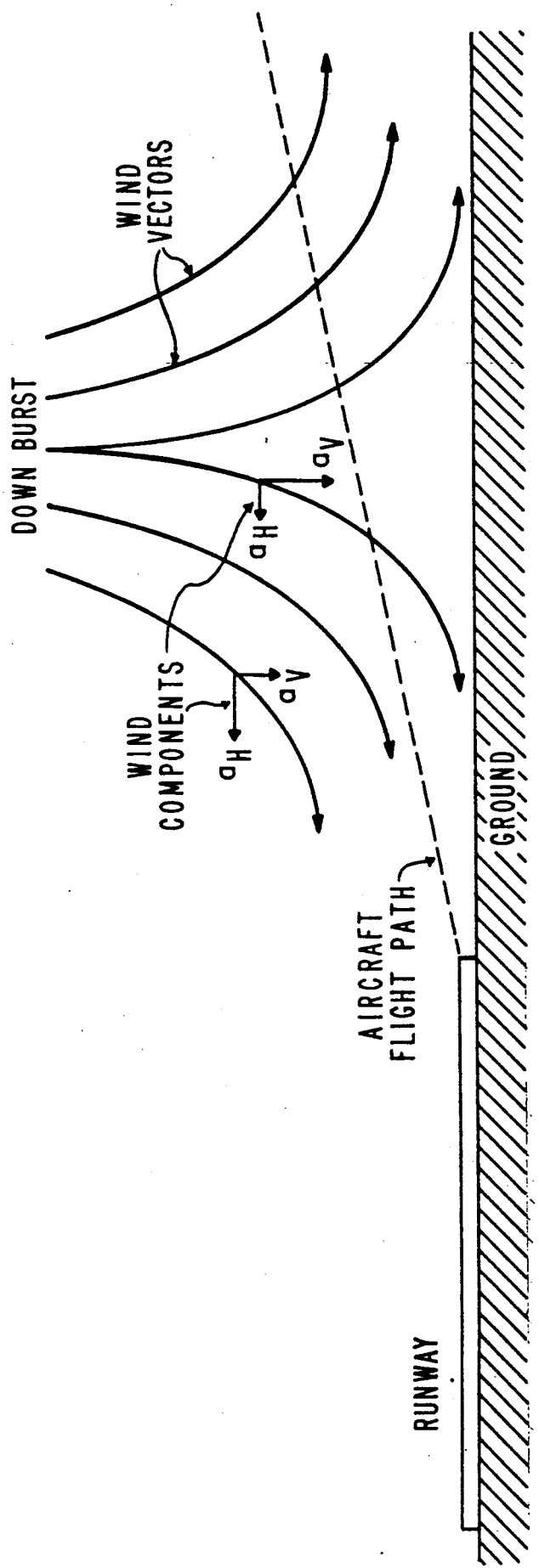
FIG. 1 is a pictorial representation of a downburst windshear envelope relative to the runway and flight path of an aircraft, showing the horizontal and vertical vector components of the windshear at predetermined points.

The most dangerous type of windshear is termed a "microburst" and will be encountered at low altitudes during the aircraft's takeoff and approach phases of flight when the aircraft is most susceptible to the situation. FIG. 1 illustrates the streamline envelope of a typical microburst relative to the flight path of an aircraft and the runway. The longitudinal and vertical wind components $a_H$ and $a_V$, are illustrated at several points. An onboard computer can be used in the detection of windshear conditions by monitoring of certain measured sensor parameters. Once a windshear condition is detected, the pilot can be alerted to this fact, so that appropriate measures can be taken to fly the aircraft to safety.

As the microburst may produce head windshears and upward vertical winds prior to tail windshears and downward vertical winds, it is prudent to alert the pilot to all forms of encountered windshears. The present invention provides a cautionary annunciation in the event of a head windshear or upward vertical wind and a warning annunciation in the event of a tail windshear or downward vertical wind.

As can be seen in FIG. 1, the wind vectors of a microburst may be resolved into longitudinal and vertical components. For ease of explanation, the description of windshear detection for the present invention will be discussed in terms of the components.

Upon encountering a purely longitudinal tail windshear, the aircraft's speed initially begins decaying at the rate of the shear itself. The aircraft's energy with respect to the airmass is give by the equation:

$$E = WV^2/2g + Wh \qquad (1)$$

where E is the aircraft's total energy in ft.-lbs., W its weight in lbs., V its velocity in ft./sec., h its altitude in feet above the ground, and g the gravitational constant. The tail windshear reduces the aircraft's velocity with respect to the airmass, and consequently, the aircraft's energy decreases. The allowable decrease in energy is not unbounded; below a known level, the aircraft can no longer be safely flown. This lower bound is the energy level that corresponds to a speed known as "stick shaker" speed. Stick shaker speed is typically 105 percent of the stall speed of the aircraft, and is generally accepted as the lowest possible speed for safe flight. At stick shaker speed, a mechanical vibrator attached to the pilot's control column is activated to warn the pilot of impending stall, hence the terminology "stick shaker".

Figure 2:
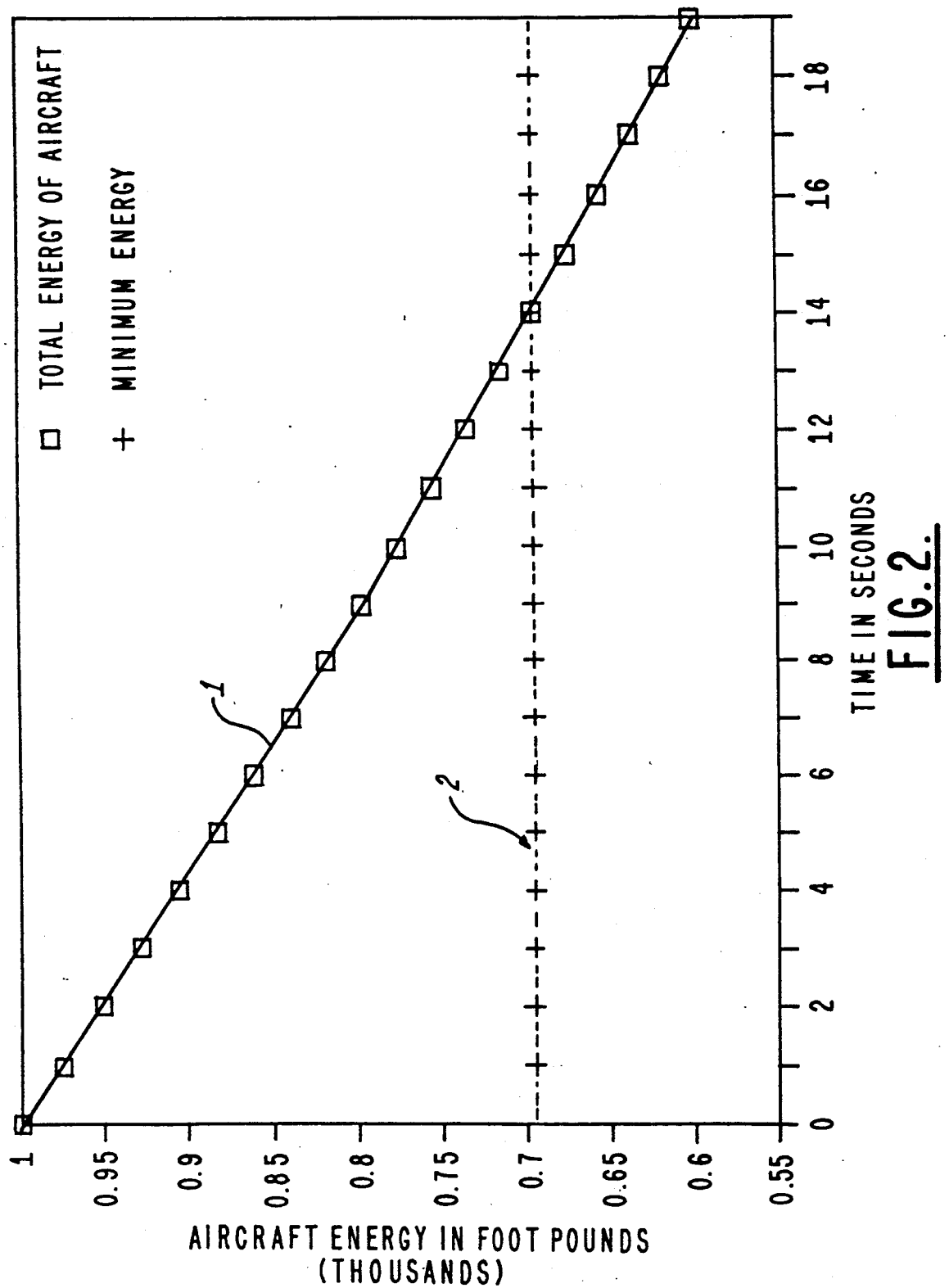
FIG. 2 is a graph showing the energy loss of an aircraft as a function of time in the presence of a purely longitudinal windshear.

Assuming for the moment that the aircraft's altitude does not change appreciably during the initial encounter with the windshear, the energy change due to the shear is reflected in the term $V^2$. Consequently, as the tail windshear persists, the aircraft's energy approaches the minimum allowable state. FIG. 2 is a graph illustrating the loss in energy in a tailwind encounter for a typical commercial jet airliner in the presence of a longitudinal windshear. In FIG. 2, the aircraft experiences a constant tail windshear of 3 knots per second. Line segment 1 refers to the total energy of the aircraft, and Line segment 2 illustrates the minimum acceptable energy state of the aircraft corresponding to stick shaker speed.

It will be clear from the foregoing that the rate of energy loss is a function of the magnitude of the tail windshear. Low magnitude shears decrease the energy more slowly than do high magnitude shears. By knowing the magnitude of the shear, it is possible to predict the energy loss of the aircraft.

The magnitude of a windshear may be determined from the following well-known equation:

$$V_g = V_a + V_w \qquad (2)$$

where $V_g$ is the aircraft's speed relative to the ground, $V_a$ is the speed of the aircraft relative to the airmass, and $V_w$ is the speed of the wind relative to the ground. The derivative of equation (2) with respect to time yields:

$$\dot{V}_g = \dot{V}_a + \dot{V}_w \qquad (3)$$

where $\dot{V}_g$, $\dot{V}_a$ and $\dot{V}_w$ are used to denote derivatives with respect to time. Solving equation (3) for $V_w$ gives the equation:

$$\dot{V}_w = \dot{V}_g - \dot{V}_a \qquad (4)$$

The term $\dot{V}_g$ may be measured using a conventional accelerometer mounted in the aircraft so as to produce an electrical signal proportional to the aircraft's longitudinal acceleration. The term $\dot{V}_a$ may be derived from a true airspeed signal supplied by a conventional air data computer. Then, by equation (4), the magnitude of the windshear, that is the time rate of change of the wind, may be determined.

Since the airspeed of the aircraft, both with respect to the airmass and with respect to the ground, initially decreases at the same rate as the windshear, the magnitude of the windshear can be used to determine the energy loss of the aircraft due solely to the windshear. In this way, normal energy changes made by the pilot by decreasing engine power, changing flap positions, lowering the landing gear, etc., may be ignored, and only energy changes due to windshear considered.

From FIG. 2, the aircraft's energy decreases with time in a tail windshear. Consequently, by integrating the magnitude of the windshear, one may measure the net decrease in energy caused by the windshear. When the energy loss is a predetermined percentage of the difference between the aircraft's energy before the shear encounter and the minimum allowable energy, an alert to the pilot may be given to apprise him/her of the situation.

In the case of a head windshear, the foregoing analysis is identical except that the aircraft gains energy. Consequently, the same equations apply in the computation of energy gain and may be used to provide a cautionary annunciation to the human pilot.

The present invention may be implemented by using conventional analog circuitry and computation techniques or by using conventional wholly digital techniques, or by a combination of conventional hybrid digital-analog techniques. For example, summation devices, multipliers, and rate takers may be implemented by operational amplifiers appropriately configured, while logic and mathematical functions may be implemented in a digital computer or the hardware equivalent. Since the functional units represented by the various blocks may be any one of the numerous devices for each respective function well-known in the art, it is considered unnecessary to show circuit detail. For clarity and understanding of the invention, a generally analog format will be shown, it being understood that the same analog format may also represent the programming of a programmable digital computer wherein the various analog inputs are converted to digital signals for digital processing and the various digital outputs are converted to analog signals.

Figure 3:
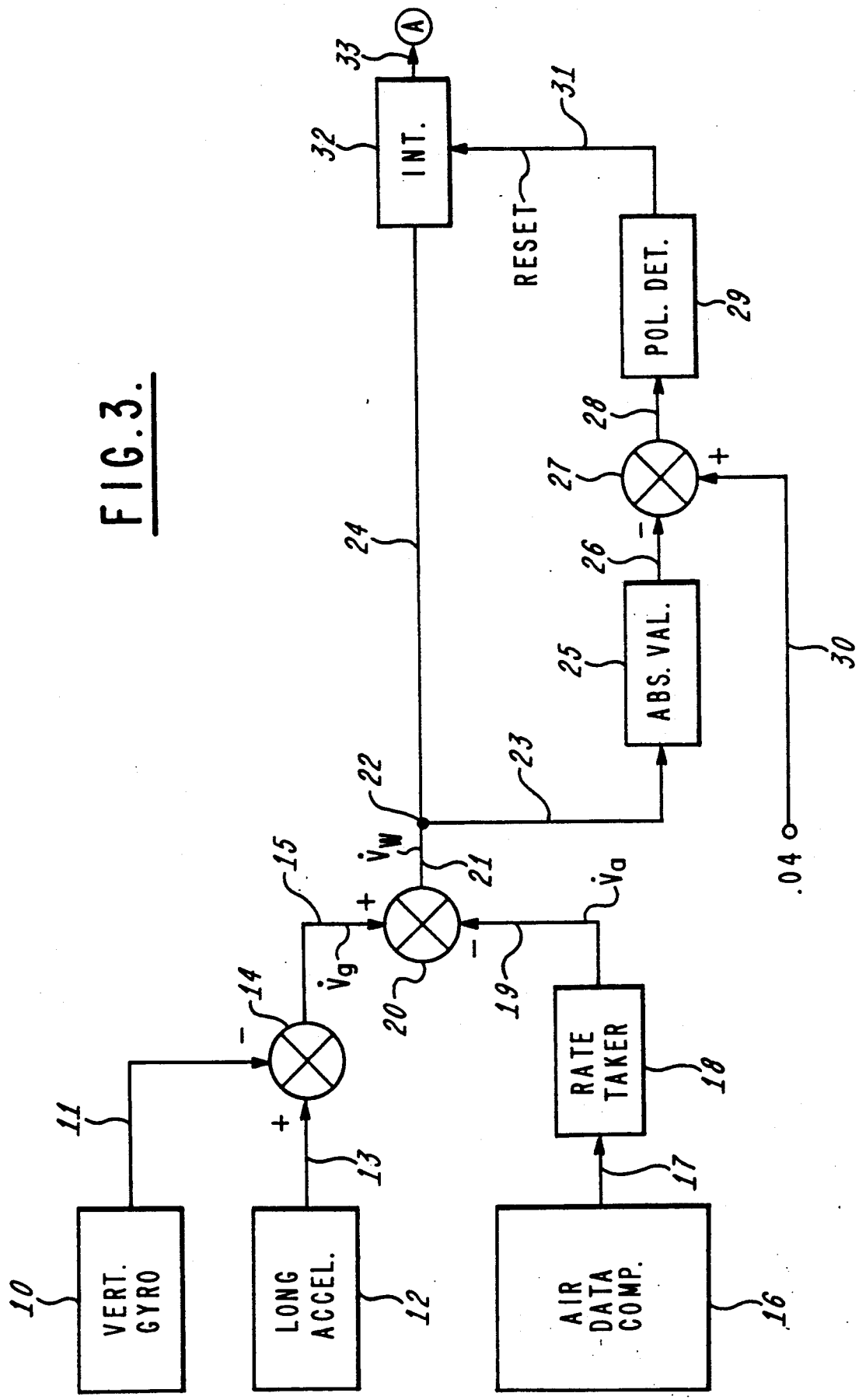
FIG. 3 is a schematic block diagram illustrating apparatus for the measurement of windshear along the longitudinal axis of an aircraft, as in the present invention.

Referring now to FIG. 3, conventional accelerometer 12 which is mounted aboard the aircraft produces a signal on lead 13 that is proportional to the longitudinal acceleration of the aircraft measured in g's. Lead 13 supplies a signal to conventional summation device 14. Simultaneously, vertical gyroscope 10 supplies a signal proportional to the pitch angle of the aircraft on lead 11. The signal on lead 11 is necessary to correct errors in the accelerometer reading due to the pitch angle of the aircraft. Lead 11 supplies a signal to conventional summation device 14. Summation device 14 acts in such a manner as to produce the difference between the signal on lead 13 and the signal on lead 11. This difference appears on lead 15 and then is coupled to a second conventional summation device 20.

Conventional air data computer 16 supplies a signal on lead 17 that is proportional to the true airspeed of the aircraft. Lead 17 supplies conventional rate taker 18. Rate taker 18 operates in such a manner as to produce the time rate of change of the signal on lead 17 on lead 19 and simultaneously converts the signal into units of g's. Hence, the signal on lead 19 is proportional to the time rate of change of true airspeed or $\dot{V}_a$ in equation (4). Lead 19 supplies conventional summation device 20. Summation device 20 operates in such a fashion as to produce the algebraic sum of the signals on leads 15 and 19 on lead 21. Hence the signal on lead 21 is proportional to the difference between the longitudinal acceleration signal and the true airspeed rate signal and thus is equivalent to the right side of equation (4) and hence is the measure of the magnitude of the windshear. Lead 21 supplies a signal to junction 22 and thus to leads 23 and 24.

Lead 24 supplies the signal proportional to windshear magnitude to conventional integrator 32. Integrator 32 operates in such a way as to produce the time integral on lead 33 of the signal appearing on lead 24 provided integrator 32 has not been reset. The resetting of the integrator will now be discussed.

Lead 23 supplies the signal proportional to the windshear magnitude to conventional absolute value taker 25. Absolute value taker 25 produces the positive magnitude of the windshear on lead 26 whether or not the sign of the signal on lead 23 is positive or negative. Lead 26 supplies conventional summation device 27. Simultaneously, a signal equivalent to a value of 0.04 g is supplied to summation device 27 via lead 30. Summation device 27 outputs a signal representative of the difference between the signals on leads 30 and 26 and supplies the difference to conventional polarity detector 29 via lead 28.

Polarity detector 29 produces either a signal equivalent to a logical zero or a signal equivalent to a logical one on lead 31 dependent on the sign of the signal appearing on lead 28. If the signal on lead 28 is positive, indicating that the windshear magnitude is less than 0.04 g, the signal on lead 31 will be a logical 1. Conversely, if the signal on lead 28 is negative in sign, indicating that the magnitude of the shear is greater than 0.04 g, the signal on lead 31 will be a logical zero. Lead 31 supplies the reset input of integrator 32. A logical one appearing on lead 31 will cause the integrator output on lead 33 to be zero, whereas a logical zero on lead 31 will permit normal operation of the integrator.

It will be appreciated that the signal appearing on lead 33 will be the time integral of the signal appearing on lead 24 provided that the absolute value of the windshear magnitude is greater than 0.04 g; otherwise, the signal on lead 33 will be zero. The purpose of the resetting of the integrator is to preclude small biases that may be present on lead 24 from being integrated to large values that could result in a false windshear detection.

Lead 33 supplies terminal A whose function has yet to be described.

It is now convenient to discuss the effects of purely vertical winds on the aircraft. Unlike longitudinal tail windshears which decrease the aircraft's kinetic energy toward a predefined minimum energy state, downward vertical winds tend to reduce the aircraft's potential energy. It is not possible to explicitly define a minimum allowable potential energy state since the aircraft's potential energy continually decreases in the case of landing. Therefore, the analysis of downward vertical winds is done relative to energy rate.

The total energy rate of the aircraft may be determined by the equation:

$$\dot{E} = mV\dot{V} + mg\dot{h} \qquad (5)$$

where $\dot{E}$ is the energy rate of the aircraft, m the aircraft's mass, V the aircraft's speed, $\dot{V}$ the aircraft's acceleration, g the gravitational constant and $\dot{h}$ the aircraft's altitude rate.

From the relationship that mass equals weight divided by the gravitational constant, Equation (5) becomes:

$$\frac{\dot{E}}{W} = \frac{V\dot{V}}{g} + \dot{h} \qquad (6)$$

where W is the weight of the aircraft in pounds. The term on the left of the equation is generally referred to as specific energy rate.

Equation (6) may be solved relative to inertial space or relative to the airmass, wherein the V, $\dot{V}$ and $\dot{h}$ terms would be relative to inertial space or the airmass respectively:

$$\dot{E}/W = V_g \dot{V}_g/g + \dot{h}_g \qquad (7)$$

$$\dot{E}/W = V_a \dot{V}_a/g + \dot{h}_a \qquad (8)$$

where $V_g$ is the inertial or ground speed of the aircraft, $\dot{V}_g$ is the rate of change of ground speed with time, $\dot{V}_a$ is the rate of change of true airspeed with time, $V_a$ is the true airspeed of the aircraft, $\dot{h}_g$ is the altitude rate relative to the ground, and $\dot{h}_a$ is the altitude rate relative to the airmass. The difference between the inertial referenced specific energy rate and the airmass specific energy rate may be found by subtracting equation (8) from equation (7):

$$\Delta\dot{E}/W = 1/g(V_g \dot{V}_g - V_a \dot{V}_a) + (\dot{h}_g - \dot{h}_a) \qquad (9)$$

Assume that the aircraft experiences a purely downward vertical wind. Then the terms $V_g$ and $V_a$ are zero, and equation (9) reduces to:

$$\Delta\dot{E}/W = \dot{h}_g - \dot{h}_a \qquad (10)$$

The equation that relates vertical wind to ground and airmass reference frames is analogous to equation (2) above:

$$\dot{h}_g = \dot{h}_a + \dot{h}_w \tag{11}$$

Solving for $h_w$ results in:

$$\dot{h}_w = \dot{h}_g - \dot{h}_a \tag{12}$$

Note that the right side of equation (12) is identical to the right side of equation (10). Taking the first derivative of equation (12) with respect to time produces:

$$\ddot{h}_w = \ddot{h}_g - \ddot{h}_a \tag{13}$$

The first term on the right side of equation (13) is the vertical acceleration of the aircraft with respect to the ground and may be obtained by an accelerometer mounted on the aircraft such that vertical acceleration is sensed. The second term on the right side of equation (13) is the aircraft's acceleration relative to the airmass. This term may be computed from the following well-known relationships that use small angle approximations:

$$\gamma = \theta - \alpha \tag{14}$$

( where $\gamma$ is the aircraft's flight path angle relative to the airmass, $\theta$ the aircraft's pitch angle, and $\alpha$ the aircraft's angle of attack. Furthermore:

$$\gamma = \dot{h}_a / V_a \tag{15}$$

Equating the right sides of equations (14) and (15) produces:

$$\theta - \alpha = \dot{h}_a / V_a \tag{16}$$

Solving for $\dot{h}_a$ and taking the derivative with respect to time yields the equation:

$$\ddot{h}_a = \dot{V}_a(\theta - \alpha) + V_a(\dot{\theta} - \dot{\alpha}) \tag{17}$$

Hence, equation (13) may now be solved for the vertical wind rate, $\ddot{h}_w$.

In the case of upward vertical winds, the foregoing analysis is identical except that the aircraft tends to gain potential energy. Consequently, the equations may be used to determine the increase in specific energy rate and thereby used to caution the pilot of an encounter with a vertical wind.

Figure 4:
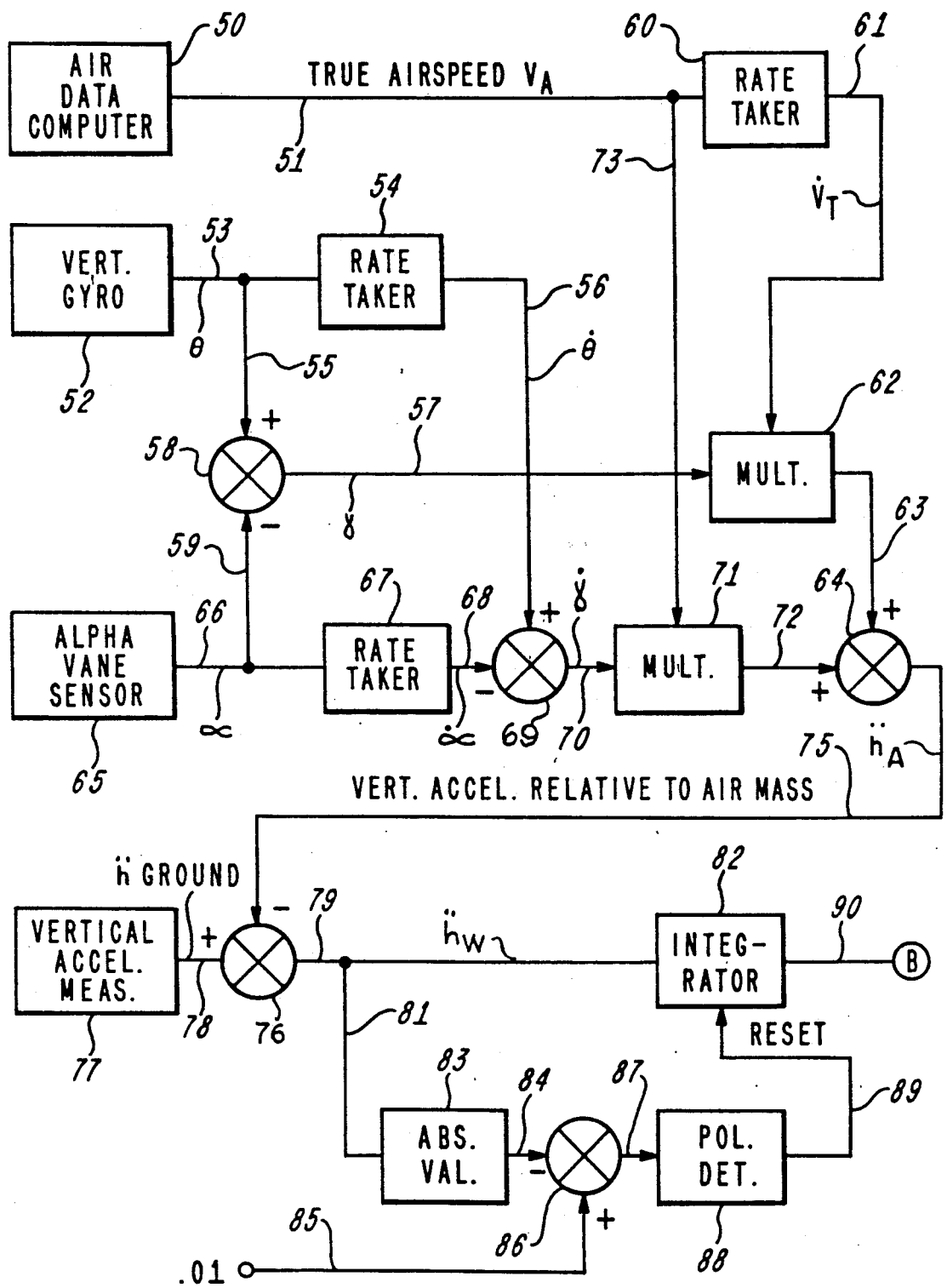
FIG. 4 is a schematic block diagram illustrating apparatus for the measurement of windshear along the vertical axis of an aircraft, as in the present invention.

Referring now to FIG. 4, conventional air data computer 50 supplies a signal proportional to the true airspeed of the aircraft on lead 51. Lead 51 supplies conventional rate taker 60, which operates in such a manner as to supply a signal proportional to the time rate of change of true airspeed on lead 61.

Simultaneously, conventional vertical gyroscope 52 supplies a signal proportional to the pitch angle, or $\theta$, of the aircraft on leads 53 and 55. Alpha vane sensor 65 supplies a signal proportional to the angle of attack, or $\alpha$, on leads 66 and 59. Leads 55 and 59 supply a conventional summation device 58, whose function is to output a signal proportional to the difference between leads 55 and 59, $\theta - \alpha$, on lead 57. From equation (14), it will be seen that the signal on lead 57 is the flight path angle $\gamma$. Lead 57 supplies conventional multiplier 62 which also receives a signal proportional to true airspeed rate on lead 61 as discussed heretofore. Multiplier 62 outputs a signal proportional to the product of the signals on leads 57 and 61 on lead 63. By the foregoing actions, the first term on the right hand side of equation (17) is produced on lead 63.

Concurrently, lead 53 supplies conventional rate taker 54, which operates such that a signal proportional to the time rate of change of the aircraft's pitch angle appears on lead 56. Lead 66 supplies conventional rate taker 67 which operates such that a signal proportional to the time rate of change of the aircraft's angle of attack is produced on lead 68. Leads 56 and 68 supply conventional summation device 69, which acts to produce a signal proportional to the difference between the signal on lead 56 and lead 68 upon lead 70. In this manner, a signal proportional to $\dot{\theta} - \dot{\alpha}$ is produced. Lead 70 supplies conventional multiplier 71. Multiplier 71 also receives a signal proportional to the true airspeed of the aircraft via leads 51 and 73. Multiplier 71 produces a signal on lead 72 that is proportional to the product $V_a(\dot{\theta} - \dot{\alpha})$ to the last term on the right of the equation (17).

Leads 63 and 72 supply conventional summation device 64 which acts in such a manner as to produce the algebraic sum of the signals on leads 63 and 72 on lead 75. By this action, the quantity $\ddot{h}_a$ of equation (17) is obtained, which is the vertical acceleration of the aircraft with respect to the airmass.

Vertical accelerometer 77 supplies a signal proportional to the vertical acceleration of the aircraft relative to the ground on lead 78 and thence to conventional summation device 76. Summation device 76 also receives a signal on lead 75 as discussed heretofore. Summation device 76 outputs on lead 79 a signal proportional to the difference between the signals on leads 78 and 75 which represents the solution to equation.

Lead 79 supplies conventional integrator 82. Integrator 82 acts such that a signal proportional to the time integral of the signal on lead 79 appears on lead 90 and thence to terminal B unless a reset signal has been received via lead 89. If a reset signal, a logical one, is received on lead 89, integrator 82 will output a null signal on lead 90. If a signal representing a logical zero appears on lead 89, the integrator performs normally.

The control of the reset function of integrator 82 will now be discussed. The signal on lead 79, the aircraft's specific energy rate is supplied to conventional absolute value detector 83 via lead 81. Absolute value detector 83 produces a positive signal on lead 84 equal in magnitude to the signal appearing on lead 81 regardless of the sign of the signal on lead 81. Lead 84 supplies conventional summation device 86. Simultaneously, a signal proportional to 0.01 g appears on lead 85 and thence to summation device 86. Summation device 86 produces a signal proportional to the difference between the signal on lead 85 and the signal on lead 84 upon lead 87. Lead 87 supplies conventional polarity detector 88. Polarity detector 88 produces a signal representing a logical one on lead 89 if the signal on lead 87 is positive in sign; otherwise, polarity detector 88 produces a signal representing a logical zero on lead 89.

From the foregoing, it will be appreciated that integral signals representing longitudinal and vertical windshears are produced as a result of the mechanisms represented by FIGS. 3 and 4.

Figure 5:
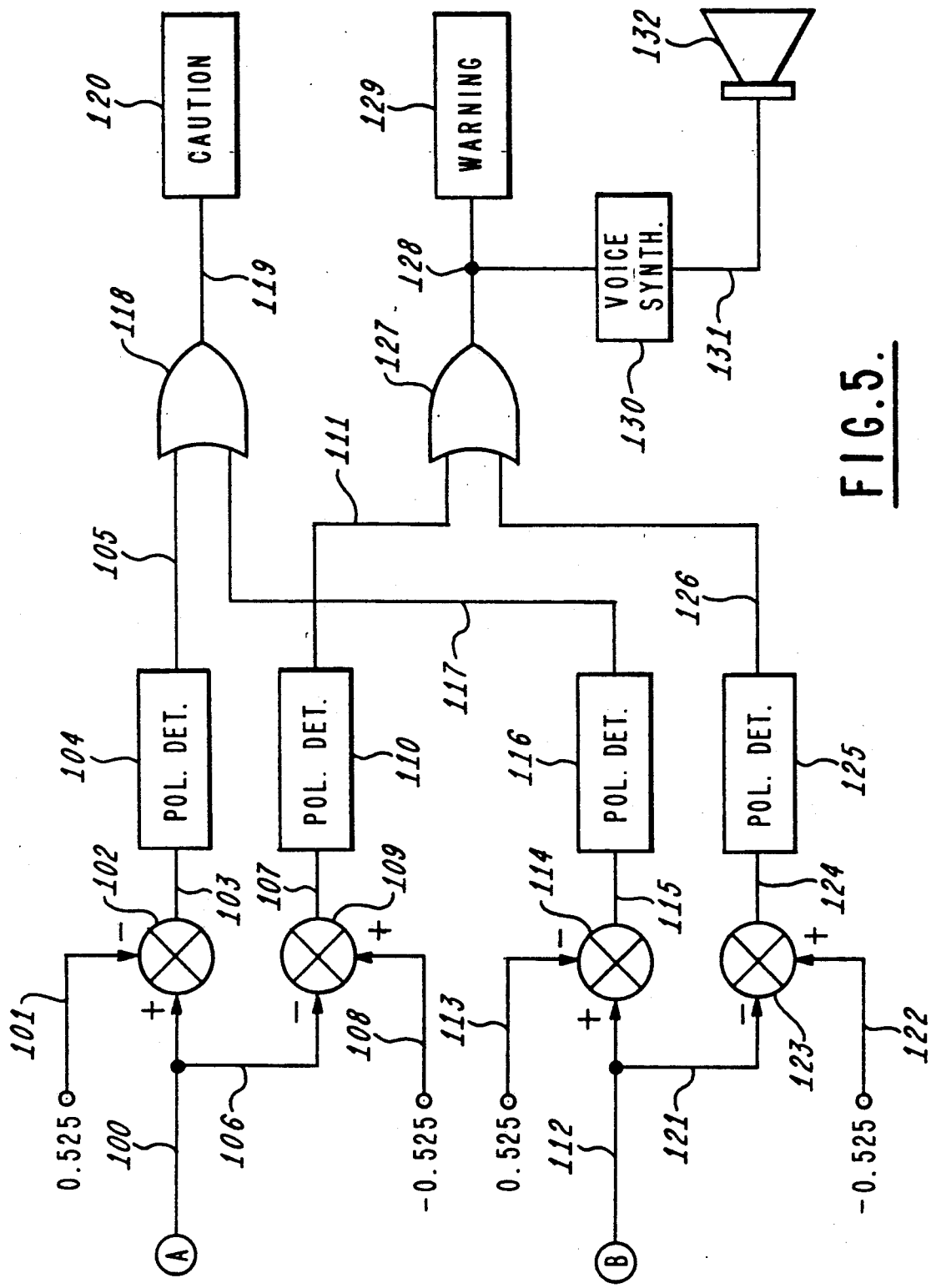
FIG. 5 is a schematic block diagram of apparatus showing how the signals from FIGS. 3 and 4 are combined to implement the annunciation of a windshear to the human pilot.

Referring now to FIG. 5, the signal from terminal A appears on lead 100 and thence to conventional summation device 102. A signal proportional to a predetermined level, as for example 0.525 g-sec, appears on lead 101 and also supplies summation device 102. Summation device 102 produces a signal proportional to the difference between the signal on lead 100 and lead 101 on lead 103 and thence to conventional polarity detector 104. Polarity detector 104 acts in such a manner as to produce a logical one on lead 105 if the sign of the signal on lead 103 is positive, otherwise polarity detector 104 produces a logical zero on lead 105. A logical one on lead 105 indicates that the value on lead 100 has exceeded the predetermined level present on lead 101.

The signal from terminal B of FIG. 4 appears on lead 112 and thence to conventional summation device 114. A signal representing a predetermined level, as for example 0.525 g-sec, appears on lead 113 which also supplies summation device 114. Summation device 114 outputs on lead 115 a signal proportional to the difference between the signals on leads 113 and 112. Conventional polarity detector 116 receives the output of summation device 114 via lead 115 and will output a signal representing a logical one on lead 117 if the signal on lead 112 is greater than the signal on lead 113. A logical one on lead 117 thereby indicates that the predetermined level has been exceeded. Conventional logical OR gate 118 receives the signals appearing on leads 105 and 117. OR gate 118 will output a signal representing a logical one if either or both of the signals on leads 105 and 117 are a logical one; otherwise the OR gate will output a logical zero. The output of OR gate 118 appears on lead 119 and thence to light assembly 120. Light assembly 120 will illuminate a lamp behind a translucent panel with the word "CAUTION" imprinted upon it if a logical one appears on lead 119; otherwise, the lamp is not illuminated.

Conventional summation device 107 is supplied with the signal from terminal A via leads 100 and 106. Summation device 107 also receives a signal representing a predetermined level, as for example $-0.525$ g-sec, on lead 108. Summation device 107 produces a signal on lead 109 that represents the difference between the signals appearing on leads 108 and 106. Conventional polarity detector 110 operates in an identical manner to polarity detectors discussed heretofore, and its output appears on lead 111 and thence to conventional logical OR gate 127.

In a similar manner, the signal from terminal B is supplied to conventional summation device 123 via leads 112 and 121. A signal representative of a predetermined level, as for example $-0.525$ g-sec, is also supplied to summation device 123 via lead 122. Summation device 123 outputs a signal representative of the difference between the signals on leads 122 and 121 on lead 124 and thence to conventional polarity detector 125. Polarity detector 125 operates in an identical manner to polarity detectors discussed heretofore, and its output appears on lead 126 and thence to OR gate 127. The output of OR gate 127, appearing on lead 128, will be a signal representative of a logical one if either or both of the signals on leads 111 and 126 are a logical 1.

Lead 128 supplies light assembly 129. Light assembly 129 will illuminate a lamp behind a translucent panel with the word "WARNING" imprinted upon it if a logical one appears on lead 128; otherwise, the lamp is not illuminated.

Lead 128 also supplies a commercially available voice synthesizer 130. A logical one on lead 128 will cause the voice synthesizer to output an electronic signal composed of frequencies sufficient to produce a simulated human voice announcing "Windshear" or a similar announcement to aurally warn the pilot of an impending windshear encounter via conventional audio speaker 132. A logical zero on lead 128 produces a null output from the voice synthesizer. The output of voice synthesizer 130 appears on lead 131 and thence to conventional audio speaker 132.

From the foregoing, it will be appreciated that the present invention determines the energy loss or gain from a longitudinal windshear and compares the loss or gain to predetermined levels in order to alert the human pilot of a longitudinal windshear encounter. Furthermore, the energy rate produced by a vertical windshear is computed and compared to a predetermined level to alert the pilot in a similar manner. If the computed windshear is below a predetermined threshold, the integration of windshear parameters is reset to preclude possible small sensor or computational biases from producing false alerts of windshear conditions.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. Windshear detection and warning apparatus for aircraft, comprising:
   means for providing a signal representative of an energy level of the aircraft due to the windshear,
   integrator means responsive to said signal representative of an energy level of the aircraft for providing an integral thereof with respect to time, said integral providing a measure of the change in energy level of the aircraft due to the windshear,
   means for providing a reference signal corresponding to a predetermined minimum allowable magnitude of energy level of the aircraft, said predetermined minimum allowable magnitude being independent of a windshear warning threshold,
   means for comparing the absolute value of said signal representative of an energy level of the aircraft and said reference signal and for providing a control signal for activating said integrator means when said absolute value exceeds said predetermined minimum allowable magnitude, and for deactivating said integrator means when said absolute value is less than said predetermined minimum allowable magnitude, and
   logic means responsive to said integrator means for providing a first windshear annunciation signal corresponding to an increase in energy level of said aircraft with respect to a first predetermined threshold and a second windshear annunciation signal corresponding to a decrease in energy level of said aircraft with respect to a second predetermined threshold.

2. The apparatus as set forth in claim 1, said means for providing a control signal further comprising means for providing a first logic signal when said signal representative of an energy level of the aircraft due to windshear exceeds said predetermined minimum allowable magnitude of windshear and a null logic signal when said signal representative of an energy level due to windshear does not exceed said predetermined minimum allowable magnitude of windshear, thereby to preclude small biases from being integrated to result in a false windshear warning.

3. The apparatus as set forth in claim 2 wherein said means for providing a signal representative of an energy level of the aircraft comprises means responsive to a change in kinetic energy of the aircraft due to a longitudinal windshear, further comprising:

means for providing a signal proportional to the time rate of change of speed of the aircraft with respect to the ground;

means for providing a signal proportional to the time rate of change of speed of the aircraft with respect to the sustaining airmass; and means responsive to a difference of said signal proportional to the time rate of change of speed of the aircraft with respect to the ground and said signal proportional to the time rate of change of speed of the aircraft with respect to the sustaining airmass for deriving a signal representative of a rate of change of the wind relative to the ground, said rate of change of the wind relative to the ground corresponding to the magnitude of the windshear in a longitudinal direction.

4. The apparatus as set forth in claim 3, further comprising:

air data computer means for providing a signal proportional to the longitudinal acceleration of the aircraft relative to its sustaining airmass;

longitudinal accelerometer means for providing a signal corresponding to an indicated longitudinal acceleration of the aircraft;

vertical gyro means for providing a longitudinal acceleration correction signal proportional to the acceleration of gravity;

first summation device means for algebraically combining said indicated longitudinal acceleration signal and said correction signal to provide a signal proportional to a longitudinal acceleration of the aircraft with respect to the ground; and second summation device means for algebraically combining said signal proportional to the longitudinal acceleration of the aircraft relative to its sustaining airmass and said signal proportional to longitudinal acceleration of the aircraft with respect to the ground, thereby to provide a signal indicative of a rate of change of longitudinal wind velocity relative to the ground.

5. The apparatus as set forth in claim 4, said means for providing a control signal further comprising:

absolute value means for providing an absolute value of said signal corresponding to the magnitude of the windshear in a longitudinal direction, and third summation device means for providing an algebraic sum of said absolute value signal and said reference signal so that a positive output of said third summation device means is indicative of said absolute value signal having a magnitude less than said reference signal and a negative output of said third summation device means is indicative of said absolute value signal having a magnitude greater than said reference signal.

6. The apparatus as set forth in claim 5, further comprising polarity detection means responsive to said third summation device means for providing a first predetermined logic state output in response to a positive output of said third summation device means and a second predetermined logic state output in response to a negative output of said third summation device means, said first and second logic state outputs being mutually exclusive and coupled to energize said integrator means in response to said negative output and to provide a null output of said integrator means in response to a positive output of said polarity detector means.

7. The apparatus as set forth in claim 2, wherein said means for providing a signal representative of an energy level of the aircraft due to windshear comprises means responsive to a rate of change in potential energy of the aircraft due to a vertical windshear, further comprising:

means for providing a signal proportional to the vertical acceleration of the aircraft with respect to the ground, means for providing a signal proportional to the vertical acceleration of the aircraft relative to the sustaining airmass, and means responsive to a difference of said vertical acceleration signal with respect to the ground and with respect to the airmass for deriving a further rate of change of the wind relative to the ground and for providing a signal indicative thereof corresponding to the magnitude of the windshear in a vertical direction.

8. The apparatus as set forth in claim 7, wherein said means for providing a signal proportional to the vertical acceleration of the aircraft with respect to the sustaining airmass further comprises:

air data computer means for providing a signal proportional to the true airspeed of the aircraft, vertical gyro means for providing a signal proportional to the pitch angle of the aircraft, alpha vane sensor means for providing a signal proportional to the angle of attack of the aircraft, first summation device means for algebraically combining said pitch angle signal and said angle of attack signal to derive a signal proportional to the flight path angle of the aircraft relative to the airmass, first rate means responsive to said true airspeed signal for providing a signal proportional to a rate of change thereof;

first multiplier means responsive to said flight path angle signal and said airspeed rate signal for providing a product signal thereof;

second rate means responsive to said angle of attack signal for providing a signal proportional to a rate of change thereof;

third rate means responsive to said pitch angle signal for providing a signal proportional to a rate of change thereof, second summation device means responsive to said angle of attack rate signal and said pitch rate signal for providing an algebraic sum thereof, said algebraic sum of said second summation device means providing a signal proportional to a flight path angle rate of the aircraft, second multiplier means responsive to said true airspeed signal and said flight path angle rate signal for providing a product signal thereof; and third summation device means responsive to said product signal of said first multiplier means and said product signal of said second multiplier means for providing an algebraic sum thereof, said algebraic sum of said third summation device means corresponding to said signal proportional to the vertical acceleration of the aircraft with respect to the sustaining airmass.

9. The apparatus as set forth in claim 8, wherein said means responsive to a difference of said vertical acceleration signals with respect to the ground and with respect to the airmass further comprises:

fourth summation device means responsive to said signal proportional to the vertical acceleration of the aircraft with respect to the airmass and said signal proportional to the vertical acceleration of the aircraft with respect to the ground for providing an algebraic sum thereof, thereby to provide a signal indicative of a rate of change of vertical wind velocity relative to the ground.

10. The apparatus as set forth in claim 9, wherein:

said integrator means is responsive to said signal indicative of a rate of change of vertical wind velocity relative to the ground for providing an integral thereof with respect to time, said integral providing a measure of said change in potential energy of the aircraft due to said vertical windshear.

11. The apparatus as set forth in claim 10, said means for providing a control signal further comprising:

absolute value means for providing an absolute value of said signal indicative of the magnitude of a windshear in a vertical direction, said reference signal providing a predetermined signal representative of an allowable level of spurious vertical windshear indications, fifth summation device means for providing an algebraic sum of said absolute value signal and said reference signal representative of an allowable level of spurious vertical windshear indication, so that a positive output of said fifth summation device means is indicative of said absolute value signal having a magnitude less than said signal representative of spurious vertical windshear indications and a negative output of said fifth summation device means is indicative of said absolute value signal having a magnitude greater than said signal representative of spurious vertical windshear indications, and polarity detection means responsive to said fifth summation device means for providing a first predetermined logic state output in response to a positive output of said fifth summation device means and a second predetermined logic state in response to a negative output of said fifth summation device means, said first and second logic outputs being mutually exclusive and coupled to energize said integrator means in response to said negative output and to provide a null output of said integrator means in response to a positive output of said polarity detector means.

12. The apparatus as set forth in claim 1, wherein said logic means for providing first and second windshear annunciation signals comprises means for providing a caution signal and means for providing a warning signal, said caution signal indicative of exceeding said first predetermined threshold, and said warning signal corresponding to said decrease in energy level, said means for providing a caution signal comprising:

means for providing a signal in accordance with a change in magnitude of kinetic energy of said aircraft due to a longitudinal windshear, means for providing a signal in accordance with a change in magnitude of potential energy of said aircraft due to a vertical windshear, means for applying a first predetermined signal corresponding to an allowable threshold of longitudinal windshear, means for providing a second predetermined signal corresponding to an allowable level of vertical windshear, first polarity detection means coupled to receive a sum of said change in magnitude of kinetic energy signal and said first predetermined signal and a sum of said change in magnitude of potential energy signal and said second predetermined signal, for providing a logic state output in accordance with the relative polarities of each of said summed signals, so that a logic one state is generated when said polarity detection means receives a positive input signal, and a logic null state is generated when said polarity detection means receives a negative input signal, first logic gate means coupled to said first polarity detection means to provide an output signal when either said change in magnitude of kinetic energy signal or said change in magnitude of potential energy signal exceeds the magnitude of said associated first or second predetermined signals, and caution signal means responsive to said output signal of said first logic gate means for providing an indication of a hazardous windshear condition in said logic one state of said first logic gate means.

13. The apparatus as set forth in claim 12, wherein said means for providing a warning signal further comprises:

means for providing a third predetermined signal in accordance with a further allowable threshold of longitudinal windshear, means for providing a fourth predetermined signal in accordance with a further allowable threshold of vertical windshear;

second polarity detection means coupled to receive a sum of said change in magnitude of kinetic energy signal and said third predetermined signal and a sum of said change in magnitude of potential energy signal and said fourth predetermined signal, for providing a logic state output in accordance with the relative polarities of each of said summed signals received by said second polarity detection means, so that a logic one state is generated when said second polarity detection means receives a positive input signal and a logic null state is generated when said polarity detection means receives a negative input signal, second logic gate means coupled to said second polarity detection means to provide an output signal when either said change in magnitude of kinetic energy signal or said change in magnitude of potential energy signal exceeds the magnitude of said associated third or fourth predetermined signals, and warning signal means responsive to said output signal of said second logic gate means for providing an indication of a further hazardous windshear condition of greater severity than the first mentioned hazardous indication in said logic one state of said second logic gate means.

14. The apparatus as set forth in claim 13, further comprising voice synthesis means coupled to receive said output of said second logic gate means, and having a warning message stored therein, said message delivered in audible form when activated by a logic one state of said second logic gate means.

* * * * *